(12) United States Patent
Wong et al.

(10) Patent No.: US 8,727,644 B2
(45) Date of Patent: May 20, 2014

(54) CAMERA (71) Applicant: Pelco, Inc., Clovis, CA (US)

(72) Inventors: Vincent Wong, Shanghai (CN); Junwei Geng, Shanghai (CN)

(73) Assignee: Pelco, Inc., Clovis, CA (US)

( * ) Notice: Subject to any disclaimer, the term of this patent is extended or adjusted under 35 U.S.C. 154(b) by 0 days.

(21) Appl. No.: 13/926,116

(22) Filed: Jun. 25, 2013

(65) Prior Publication Data

US 2014/0023357 A1     Jan. 23, 2014

(30) Foreign Application Priority Data

Jul. 18, 2012 (CN) .......................... 2012 1 0248743

(51) Int. Cl.
*G03B 17/56* (2006.01)
(52) U.S. Cl.
USPC .......................................... 396/427
(58) Field of Classification Search
CPC ........ G03B 17/56; G03B 17/561; H04N 7/18; H04N 5/2252; G08B 13/19619
USPC ........................................... 396/427
See application file for complete search history.

(56) References Cited

U.S. PATENT DOCUMENTS

| 4,945,367 A * | 7/1990 | Blackshear .................... 396/427 |
| 6,803,962 B1 * | 10/2004 | Elberbaum et al. ........... 348/373 |
| 2002/0085844 A1 * | 7/2002 | Tashiro et al. ................. 396/427 |
| 2005/0175335 A1 * | 8/2005 | Kajino et al. .................. 396/427 |
| 2005/0270414 A1 * | 12/2005 | Lee ................................ 348/373 |
| 2014/0023357 A1 * | 1/2014 | Wong et al. .................... 396/427 |

* cited by examiner

*Primary Examiner* — W B Perkey
(74) *Attorney, Agent, or Firm* — Hamilton Brook Smith & Reynolds, P.C.

(57) ABSTRACT

An embodiment of the invention is a camera having a housing, a camera lens disposed at an end of the housing, a box camera mounting part provided on the housing to mount the camera in a box camera configuration, and a dome camera mounting part provided at a front end of the housing to mount the camera in a dome camera configuration. Providing the box and dome camera mounting parts on the housing of the camera enables mounting of the camera in box and dome camera configurations, and allows the user to delay the decision of choosing which configuration, thereby reducing the complexity of engineering design and installation. Furthermore, inclusion of both mounting parts facilitates purchasing and stocking only one configuration of camera, thereby simplifying management of the stocked parts and reducing costs.

18 Claims, 8 Drawing Sheets

CAMERA

RELATED APPLICATION(S)

This application claims priority under 35 U.S.C. §119 or 365 to China, Application No. 201210248743.1, filed Jul. 18, 2012. The entire teachings of the above application are incorporated herein by reference.

BACKGROUND OF THE INVENTION

The present invent relates to a camera, and more particularly to a camera which can be mounted in box and dome camera configurations.

Cameras, also referred as camera lenses, are widely used in the area of field monitoring, video recording, conducting surveillance and video recording of traffic conditions, production status, and status of a particular area.

Currently, cameras are generally utilized in two configurations, namely, the box camera configuration and the dome camera configuration. In the box camera configuration, a camera is substantially housed in a columnar housing with a lens extending out from the front end of the housing, and the housing of the camera is mounted on, for example, a wall or a traffic signal mount by using a mounting bracket, the lens being positioned at a particular viewing angle. In addition, under desired circumstances, said bracket may have a function of panning or tilting, or both, to adjust the viewing angle of the camera. Such a configuration is commonly seen in the outdoor mounting of cameras. In the dome camera configuration, a camera is generally suspended and mounted onto the ceiling, the entirety of which is covered by a hemispherical transparent dome, and outer images can be captured by a lens of the camera through the hemispherical transparent dome. This lens is generally supported by a gimbal member, and the viewing angle is controlled by an appropriate control mechanism. The camera in dome camera configuration has relatively nice looking and occupies a relatively small volume; therefore, dome camera configurations are commonly used indoors or in an elevator.

SUMMARY OF THE INVENTION

Embodiments of the present invention provide a camera that can be easily accomplish box and dome camera mounting configurations, thus facilitating management of stocked parts of customers and engineering design.

According to one embodiment of the present invention, a camera is provided, comprising a housing having a front end and a lens disposed at an end of the housing, wherein a box camera mounting part is provided on the housing of the camera to enable the camera to be mounted in a box camera configuration, and a dome camera mounting part is provided at the front end of the housing of the camera where the camera lens is disposed to enable the camera to be mounted in a dome camera configuration.

In an example embodiment of the present invention, providing the box and dome camera mounting parts on the housing of the camera enables the camera to be mounted in box and dome camera configurations and allows the customer to delay the decision of choosing which configuration, thereby improving the flexibility of engineering design and installation. Furthermore, as the camera is provided in box and dome camera configurations, it is possible to only purchase and stock one configuration of cameras, which simplifies management of the stocked parts and thus reduces costs.

In a preferred embodiment, the camera lens is mounted such that it may rotate in at least one direction relative to the housing. Therefore, it is easily to adjust the pointing direction of said camera lens.

In another preferred embodiment, the camera lens comprises a spherical casing having a front end, a camera lens module fixed at the front end of the spherical casing, and a circular arched containing part provided at the end of the housing where the camera lens is disposed, and the spherical casing is slidably contained in the circular arched containing part.

In one embodiment, a damper, preferably a spring plate, is disposed between the housing and the containing part, which allows the spherical casing to remain at a desired position.

In another embodiment, box camera mounting part is provided on one side surface of the housing of the camera or on an end surface of the housing of the camera opposite the end where the camera lens is disposed.

In some embodiments, the camera may be mounted in the box camera configuration by a standard bracket configured to support the camera in the box camera configuration, the standard bracket includes at least one joint to adjust the pointing direction of the camera when in the box camera mounting configuration.

In some embodiments, the camera further comprises a front cover for covering the end where the camera lens of the camera is disposed when in box camera mounting configuration. The box cover is preferably disposed on the housing of the camera by fitting with said dome camera mounting part on the housing of said camera.

In some embodiments, front cover prevents the camera lens from contaminating by dust, rain, etc. In addition, providing the dome camera mounting part as a coupling part for mounting the front cover enables the dome camera mounting part to have multiple functions and simplifies design of the housing.

In some embodiments, the camera also comprises a dome camera mounting ring configured to fit into a hole formed in a ceiling of a room in a premises and the dome camera mounting ring is further configured to be coupled to the box camera mounting part to mount the camera in the box camera mounting configuration.

In some embodiments, the dome camera mounting ring comprises a cylindrical body having first and second ends, a flange provided at the first end of the cylindrical body, and a mounting clamp provided at the second end of cylindrical body, the dome camera mounting ring being configured to be mated to the hole in the ceiling, with a material of the ceiling being clamped between the flange and the mounting clamp.

In some embodiments, a mounting ring mounting part is provided inside the cylindrical body of the dome camera mounting ring, the mounting ring mounting part comprising a connecting part for fitting with the box camera mounting part of the housing to enable connecting with the dome camera mounting part when the camera is vertically inserted into the mounting ring mounting part such that the camera lens protrudes downwards from the ceiling. Preferably, the connecting part of the mounting ring mounting part comprises elastic fasteners.

In another embodiment, the camera lens of the camera protrudes from the ceiling by inserting the camera into the mounting ring mounting part of the dome camera mounting ring, thus completing the dome camera mounting configuration.

In yet another embodiment, The camera further comprises a dome cover which may be coupled to the dome camera mounting ring, and includes a hemispherical transparent part and a flange surrounding the transparent part. By coupling the dome cover to the dome camera mounting ring, it is possible to cover and protect the camera lens of said camera.

In an example embodiment, the flange of the dome cover and the flange of the dome camera mounting ring are connected to each other by a magnetic force such that the dome cover is coupled onto the dome camera mounting ring.

Other features of the present invention are given in the following detailed description.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Cameras in box and dome camera mounting configurations of prior art are designed or produced separately and do not have parts in common, so customers must decide which configuration of cameras to use at the beginning of an engineering design phase since the configuration cannot be changed afterwards. This causes loss of flexibility in the engineering design and installation. Further, customers have to maintain stocked parts for two configurations of cameras where cameras are used in both the box camera configuration and dome camera configuration, resulting in increased management of stocked parts and cost of use.

Referring now to the drawings, example embodiments are described below in detail.

Figure 1:
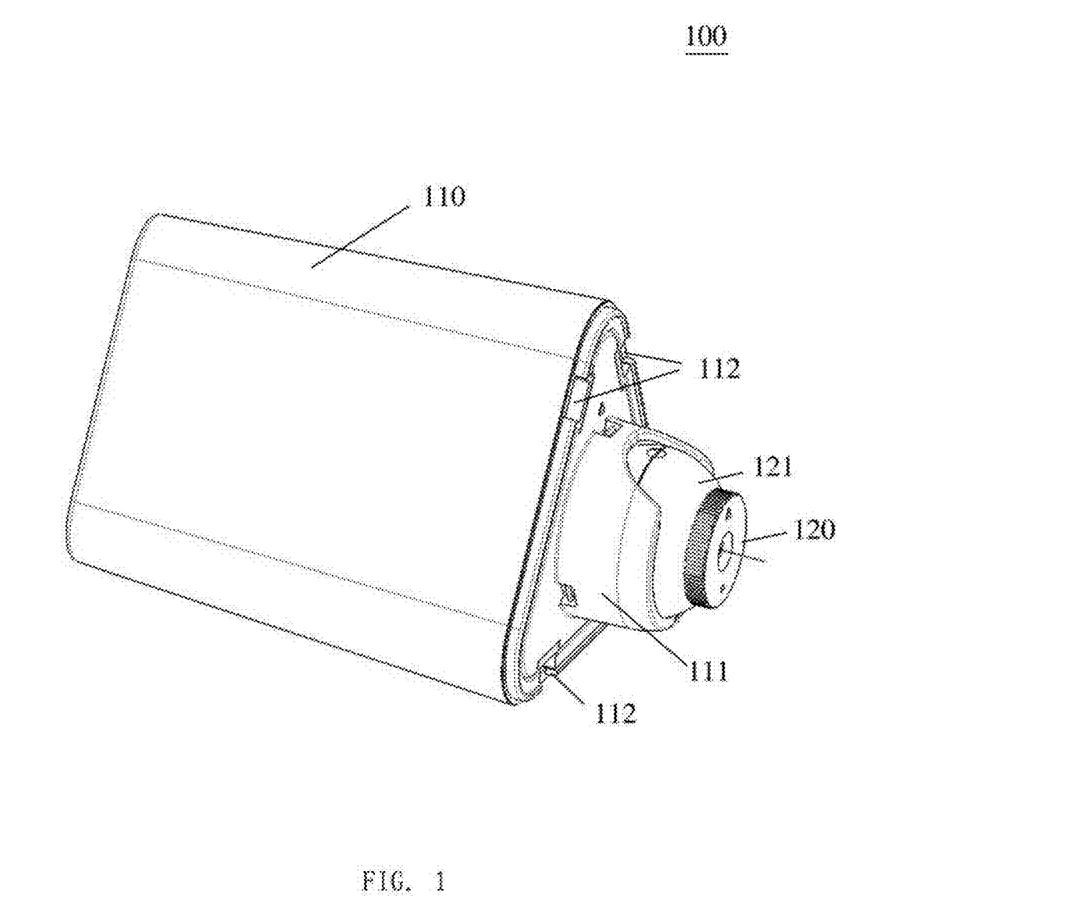
FIG. 1 shows a perspective view of a camera according to the invention.
Figure 2:
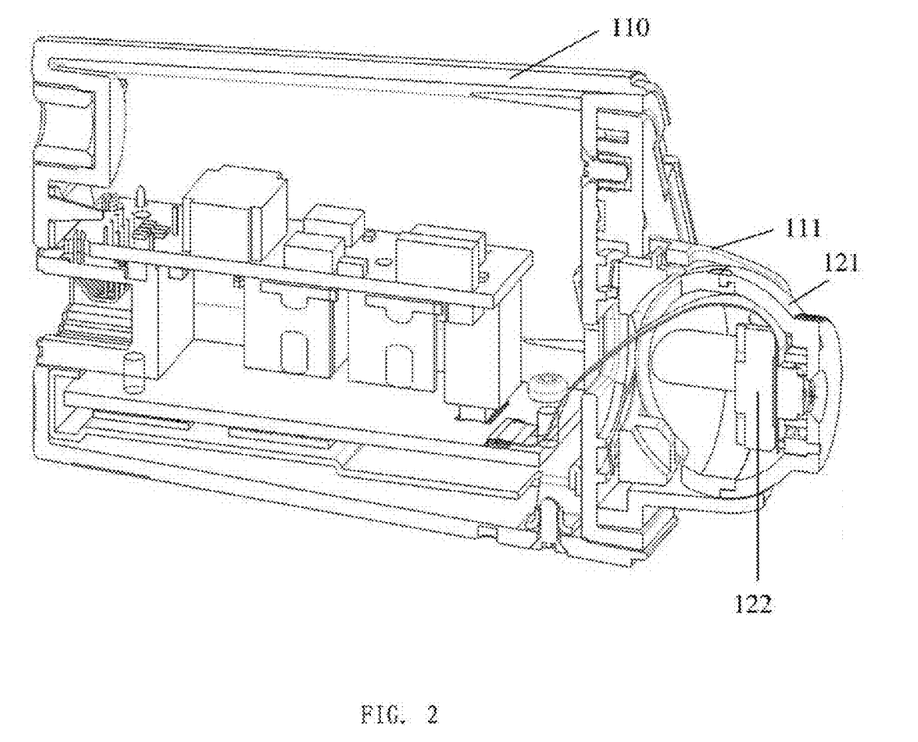
FIG. 2 shows a cross sectional view of the camera of FIG. 1.

First, referring to FIG. 1 and FIG. 2, FIG. 1 and FIG. 2 show a perspective view and a cross sectional view of the preferred embodiments according to the invention.

As shown in FIG. 1, a camera 100 comprises a housing 110 in the shape of a substantial triangular prism, and a camera lens 120 is disposed at an end (referred below as a front end) of the housing 110. The camera lens 120 comprises a spherical casing 121 and a camera lens module 122 fixed at the front end of the spherical casing 121. As shown in the drawing, a circular arched containing part 111 is projectively provided at the front end of the housing 110 of the camera, and the spherical casing 121 containing the camera lens module 122 is slidably contained in the circular arched containing part 11, thereby enabling the pointing direction of the camera lens 120 to be adjustable. It should be understood that the housing 110 is not limited to a triangular prism, and can be a cylinder, an elliptical cylinder, or a tetragonal prism, etc.

To maintain the camera lens 120 at a desired position, an appropriate damping means may be disposed between the housing 121 of the camera lens 120 and the containing part 111, for example, a spring plate that can partially press the housing to the inner surface of the containing part. In addition, the camera lens 120 may be a conventional cameral lens 120 known in the art, including lenses and image acquisition devices that transform optical images to electrical signals, such as CCD or CMOS sensors, which are generally known in the art.

As shown in FIG. 2, a circuit board on which respective circuits, for example, the signal processing circuit are mounted, is provided inside the housing 110 to process collected signals. This circuit board may be configured as desired by skilled in the art, and therefore a detailed description is omitted. A radio transmission/reception module may, if needed, be further provided inside the housing 110 for sending image signals obtained by the camera lens to a corresponding receiver and/or receiving commands from the outside wirelessly. In addition, a respective driving mechanism and a transmission mechanism may be provided inside the housing 110 for automatically adjusting the pointing direction of the camera lens 120. Electric motors, pinion and rack, etc, and corresponding control devices (circuits) may also be provided to control actions of the driving mechanism. These may be accomplished by those skilled in the art as needed.

A box camera mounting part (not shown) may be provided on one side surface of the housing 110 to fit with the box camera mounting bracket, as described later, mounting the camera in box camera configuration. Further, another box camera mounting part (not shown) may optionally be provided at the rear end of the housing 110 which is opposite the end where the camera lens is disposed, offering another choice for mounting the camera in box camera configuration.

The dome camera mounting part may be a plurality of recesses 112 provided at the edge of the front end of the housing 110 for coupling the dome camera mounting ring described later, thereby mounting the camera in dome camera configuration.

Figure 3:
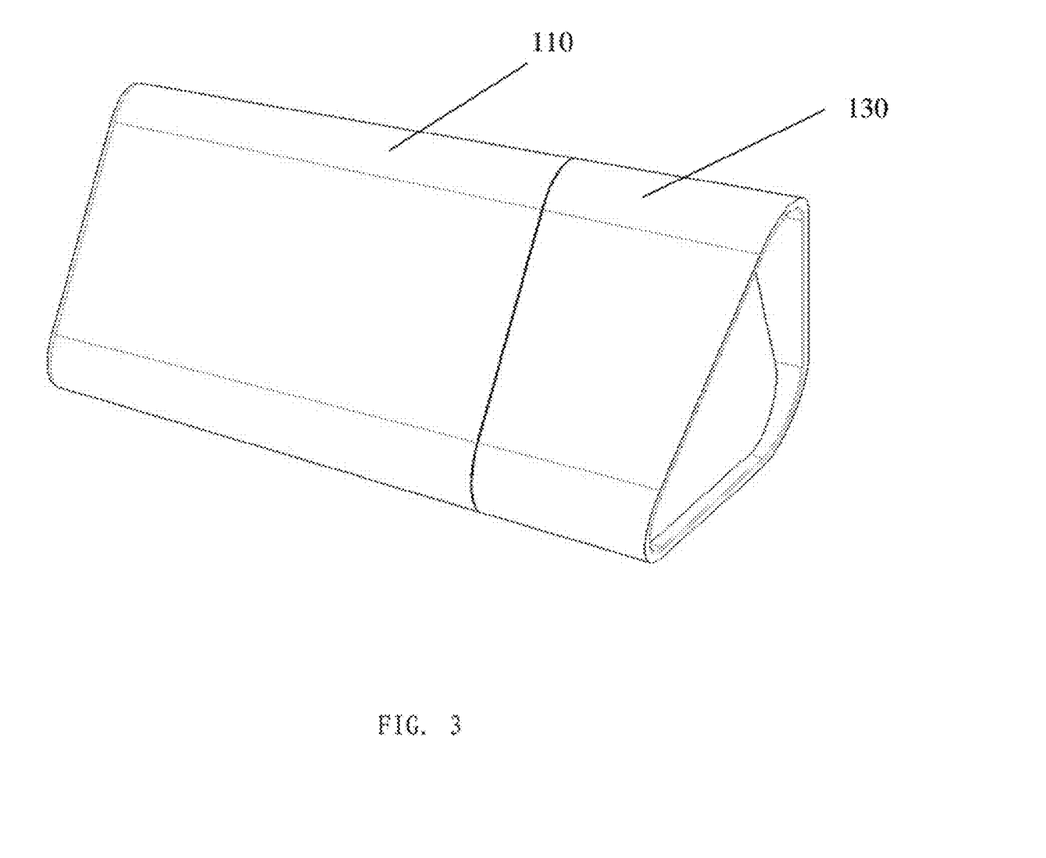
FIG. 3 shows a perspective view of a camera in box camera mounting configuration.
Figure 4A:
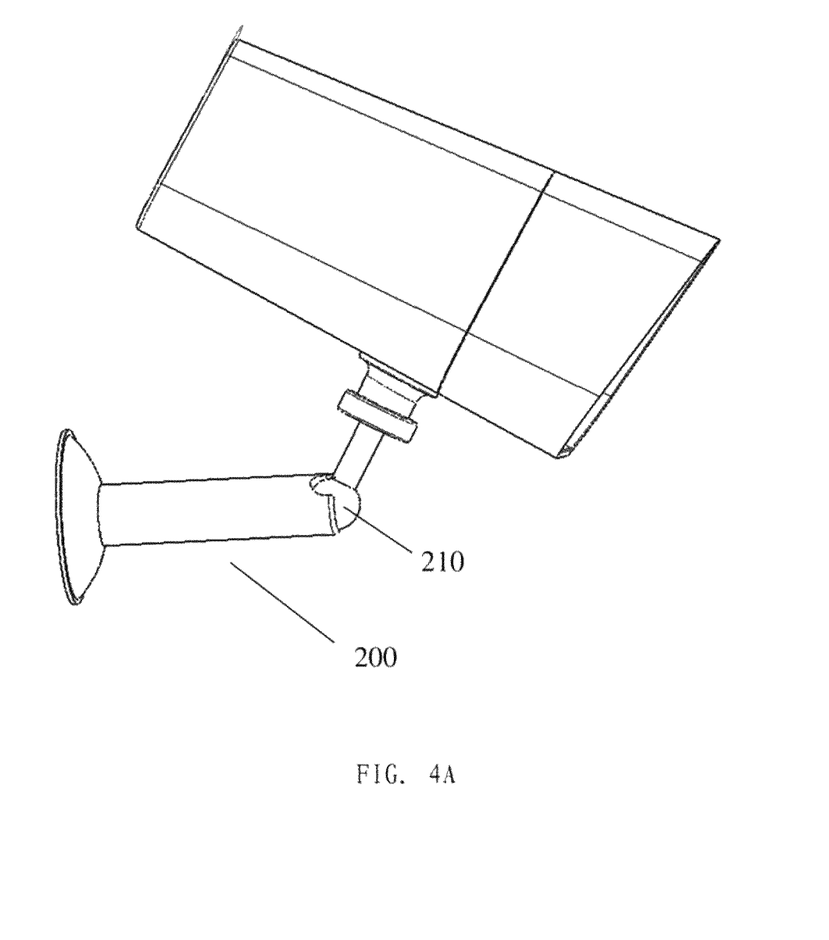
FIGS. 4A and 4B show a schematic view of the camera of FIG. 1 in two types of the box camera mounting configuration.
Figure 4B:
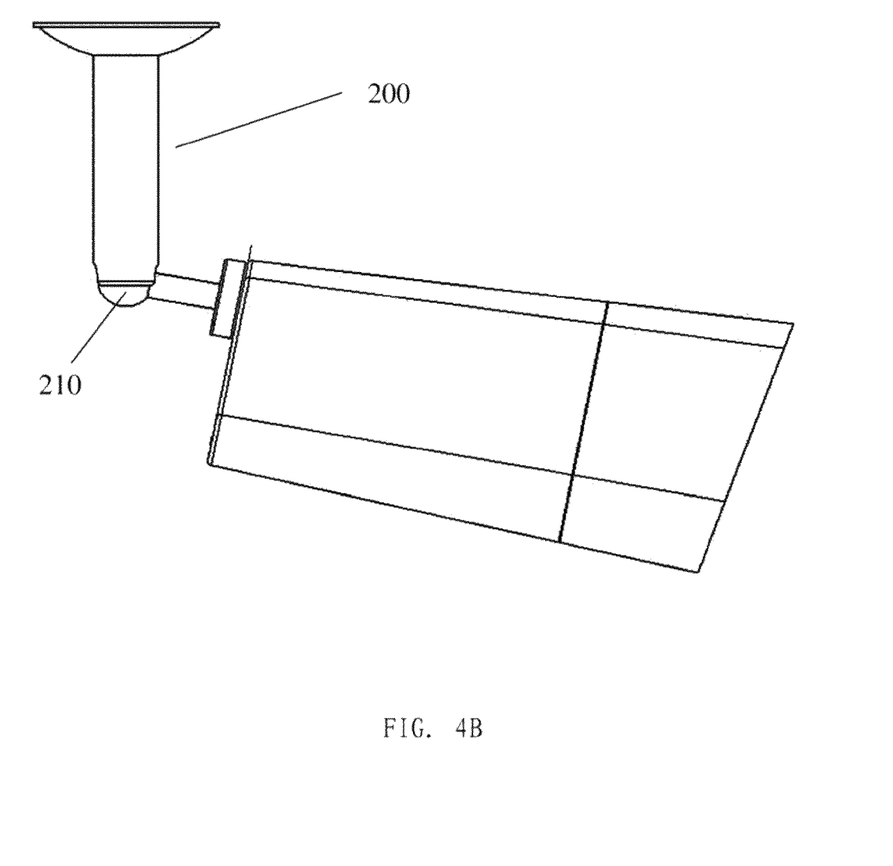

Referring to FIG. 3 and FIG. 4 now, the camera of the embodiment of the invention in the box camera mounting configuration is described.

The front cover 130 is provided at the front end of the camera 100 to be mounted in box camera configuration. The front cover 130 protects the camera 100 and, in particular, prevents the camera lens 120 from dust, rain, etc. The front cover 130 similarly has the shape of the triangular prism, corresponding to the shape of the housing, and the front end surface of the front cover is transparent or partially transparent. The front cover 130 may includes fasteners (not shown) which may be coupled to the dome camera mounting part 111 on the housing 110. Alternatively, the front cover 130 may be connected to the front end of the camera by threaded connection, magnetic connection, rivet connecting and many other ways. The invention is not restricted in this aspect, and any connection means can be utilized as long as it is able to couple the front cover 130 to the housing 110 of the camera, however, in view of multiple functions of the camera, detachable connection means is often utilized, such as threaded connection, magnetic connection, etc. In order to enhance the sealing effect, a seal (not shown) may be sandwiched between the front cover 130 and the front end surface of the housing 110.

As shown in FIGS. 4A and 4B, the camera may be coupled to the standard box camera mounting bracket 200 using the box camera mounting part provided on the housing 110. Such a box camera mounting bracket 200 may include one or more joints 210 enabling the orientation of each joint to be changed manually or automatically to adjust the pointing direction of the camera lens of the camera. In FIG. 4, the box camera mounting bracket 200 is coupled to the box camera mounting part provided on the side surface of the housing 110 to mount the camera on the wall or other surface; in FIG. 4B, the box camera mounting bracket 200 is coupled to the box camera mounting part provided on the bottom surface of the housing 110 to mount the camera onto the ceiling. The box camera mounting bracket 200 may be connected to the box camera mounting part on the housing 110 by screws, rivets or other fasteners, which may be the same as those in prior art. The bracket 200 can be connected to the housing 110 via industrial standard threaded holes, which can be selected by those skilled in the art as needed.

Figure 5:
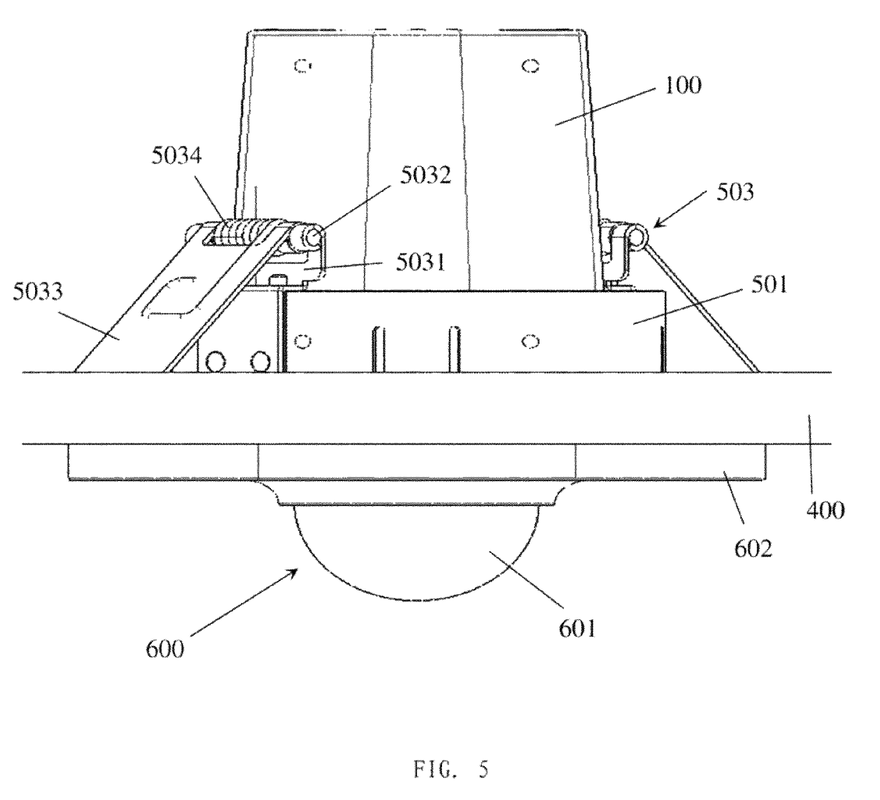
FIG. 5 shows a schematic view of the camera of FIG. 1 in dome camera mounting configuration.
Figure 6:
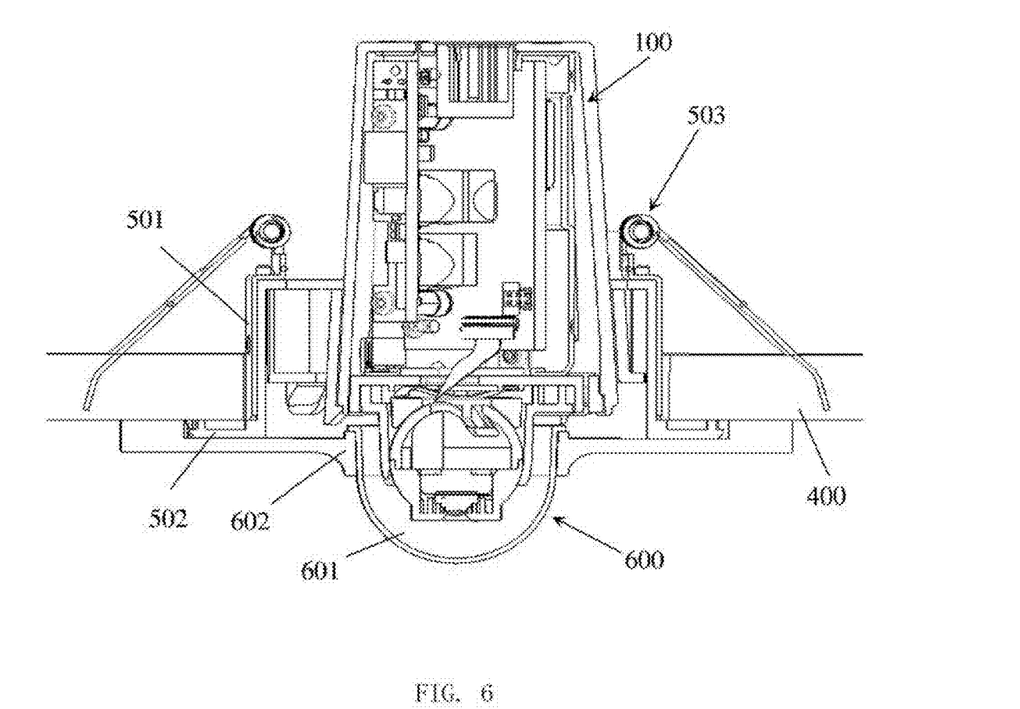
FIG. 6 shows cross sectional view of FIG. 5.
Figure 7:
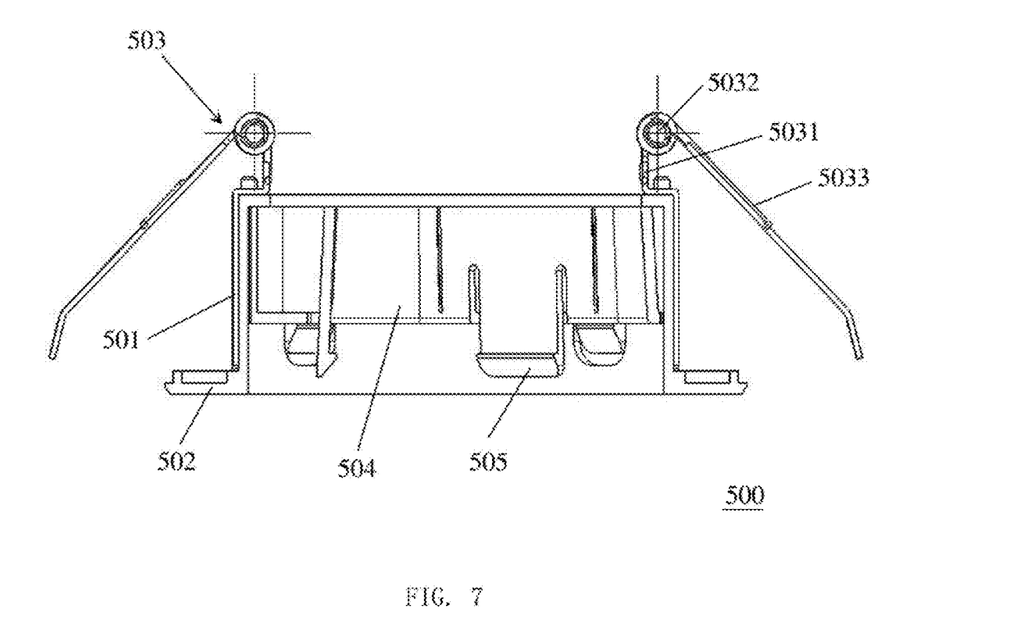
FIG. 7 shows a dome camera mounting ring of the camera in a dome camera mounting configuration.

Referring now in FIG. 5 to FIG. 7, the camera of the embodiment of the invention in the dome camera mounting configuration is described.

The camera in the dome camera mounting configuration is generally mounted on the ceiling of a room or a car of an elevator, etc. To this end, a hole with predetermined diameter on the ceiling needs to be formed in advance. To mount the camera in dome camera configuration to the hole in the ceiling 400, a dome camera mounting ring 500 needs to be provided. Such a dome camera mounting ring 500 is shown in FIG. 7.

As shown in FIG. 7, the dome camera mounting ring 500 comprises a cylindrical body 501 having a flange 502 at one end thereof and a plurality of (two in the drawing) mounting clamps 503 at the other. The mounting clamps include a first element 5031 fixed on the cylindrical body 501, a clamping piece 5033 hinged with the first element 5031 via a hinge shaft 5032 and a tensional spring 5034 provided about the hinge shaft 5032 to bias the clamping piece 5033 toward the first element 5031. The outer diameter of cylindrical body 501 is substantially the same as the diameter of the hole formed on the ceiling 400, such that the dome camera mounting ring 500 can be inserted into the hole of the ceiling thus the flange 502 abuts against the outer surface (i.e., the surface facing the bottom space) of the ceiling. Meanwhile, the clamping piece 5033 of the mounting clamp 503 is shifted to the first element 5031 by the action of the torsional spring, thereby abutting against the inner surface of the ceiling 400, and in this way the dome camera mounting ring 500 may be clamped on the ceiling 400, yet it is allowed to rotate around itself so as to adjust the viewing angle of the camera lens after mounting the camera into the dome camera mounting ring 500. Although the case that the dome camera mounting ring 500 is fixed onto the ceiling 400 by the mounting clamp 503 has been described above, other fixing ways may also be employed, such as threaded connection, etc.

A mounting ring mounting part 504 is provided inside the cylindrical body 501 of the dome camera mounting ring 500, which may be an annular wall substantially corresponding to the shape of the housing 110 of the camera, i.e., enclosing a space in the shape of a triangular prism, and a plurality of elastic fasteners 505 are projectively provided at the corresponding position of the annular wall, with the same number as that of the recesses formed at the edge of the front end of the housing 110 of the camera and located at corresponding positions, such that the elastic fasteners 505 can be inserted into the recesses 112 thereby fixing the camera into the dome camera mounting ring 500. Therefore, as shown in FIG. 6, the camera 100 may be suspended in the hole of the ceiling 400, by using the dome camera-mounting ring 500, with only the camera lens protruding from the ceiling.

The outside of the camera lens 120 is covered by the dome cover 600. The dome cover comprises the hemispherical transparent part 601 and the flange 602 around the transparent part 60. The dome cover 600 can be fixed onto the dome camera mounting ring 500 by using the flange 602, and thus covering the camera lens 120 to protect the camera lens 120. The flange 602 may be coupled to the dome camera mounting ring 500 by e.g. providing a magnet on one of the flange 602 of the dome cover 600 and the flange 502 of the dome camera mounting ring 500 and including ferromagnetic material in the other. Furthermore, the invention is not limited to this; threaded connection, rivet connection, plastic hook connections and similar connections may be possible.

By the aforementioned steps, the camera can be mounted in dome camera configuration.

Therefore, the camera can be mounted in both box and dome camera configurations, which facilitates installation and use of the camera.

Although embodiments of the invention has been described with reference to the preferred embodiments, it should be understood that the present invention is not limited to the above mentioned embodiments and various modifications and changes can be made by those skilled in the art without departing from the spirit of the invention. For example, in order to mount the camera in dome camera configuration, the recesses 112 are provided at the edge of the front end of the camera so as to be coupled to the elastic fasteners 505 of the dome camera mounting ring 500; however, in practice, these recesses 112 can be omitted and the elastic fasteners 505 of the dome camera mounting ring 500 may be directly snapped onto the front edge of the housing, which may also accomplish the mounting of the camera in dome camera configuration. Therefore, the scope of the invention is defined only by appended claims and equivalents.

While this invention has been particularly shown and described with references to example embodiments thereof, it will be understood by those skilled in the art that various changes in form and details may be made therein without departing from the scope of the invention encompassed by the appended claims.

What is claimed is:

1. A camera comprising:
    a housing having a front end;
    a camera lens disposed at the front end of the housing;
    a box camera mounting part provided on the housing to enable the camera to be mounted in a box camera configuration; and
    a dome camera mounting part provided at the front end of the housing where the camera lens is disposed to enable the camera to be mounted in a dome camera configuration.

2. The camera according to claim 1, wherein the camera lens is mounted such that the camera lens may rotate in at least one direction relative to the housing.

3. The camera according to claim 2, wherein the camera lens is part of a camera lens assembly, wherein the camera lens assembly further comprises:
    a spherical casing having a front end;
    a camera lens module fixed at the front end of the spherical casing; and
    a circular arched containing part provided at the front end of the housing, said spherical casing slidably contained in said circular arched containing part.

4. The camera according to claim 3, further comprising a damper disposed between the housing and the containing part.

5. The camera according to claim 4, wherein said damper is a spring plate.

6. The camera according to claim 1, wherein the box camera mounting part is provided on a side surface of the housing or on a rear surface of the housing, said rear surface being opposite to the front end where the camera lens is disposed.

7. The camera according to claim 6, further comprising a standard bracket configured to support the camera in the box camera configuration, said standard bracket including at least one joint to adjust the pointing direction of the camera when in the box camera mounting configuration.

8. The camera according to claim 7, further comprising a front cover, said front cover configured to cover the camera lens when the camera is in the box camera mounting configuration.

9. The camera according to claim 8, wherein said front cover is mounted on the housing of the camera by fitting with said dome camera mounting part provided at the front end of the housing of said camera.

10. The camera according to claim 8, wherein the front cover is connected to the front end of the housing of the camera by a magnetic force.

11. The camera according to claim 1, further comprising a dome camera mounting ring configured to fit into a hole formed in a ceiling of a room in a premises and wherein the dome camera mounting ring is further configured to be coupled to the box camera mounting part to mount the camera in the box camera mounting configuration at the hole formed in the ceiling of the room.

12. The camera according to claim 11, wherein the dome camera mounting ring comprises:

a cylindrical body having first and second ends;

a flange provided at the first end of the cylindrical body; and a mounting clamp provided at the second end of cylindrical body, the dome camera mounting ring being configured to be mated to the hole in the ceiling, with a material of the ceiling being clamped between the flange and the mounting clamp.

13. The camera according to claim 12, further comprising a mounting ring mounting part provided inside the cylindrical body of the dome camera mounting ring, said mounting ring mounting part comprising a connecting part for fitting with the box camera mounting part of the housing to enable connecting with the dome camera mounting part when the camera is vertically inserted into the mounting ring mounting part such that the camera lens protrudes downwards from the ceiling.

14. The camera according to claim 13, wherein the connecting part of said mounting ring mounting part further comprises elastic fasteners for fitting with the dome camera mounting part of the housing.

15. The camera according to claim 14, wherein the dome camera mounting part defines a plurality of recesses provided at an edge of the front end of the housing.

16. The camera according to claim 14, wherein the dome camera mounting part is an edge of the front end of the housing.

17. The camera according to claim 12, further comprising a dome cover coupled to the dome camera mounting ring, said dome cover comprising a hemispherical transparent part and a flange surrounding said transparent part.

18. The camera according to claim 17, wherein the flange of the dome cover is connected to the flange of the dome camera mounting ring by a magnetic force such that the dome cover is coupled onto the dome camera mounting ring.

\* \* \* \* \*